United States Patent
Mermelstein et al.

(10) Patent No.: US 9,917,322 B2
(45) Date of Patent: Mar. 13, 2018

(54) ELECTRICAL POWER DISTRIBUTION SYSTEM AND METHOD FOR A GRID-TIED REVERSIBLE SOLID OXIDE FUEL CELL SYSTEM

(71) Applicant: The Boeing Company, Chicago, IL (US)

(72) Inventors: Joshua M. Mermelstein, Laguna Niguel, CA (US); Sergio Espinoza, Huntington Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 200 days.

(21) Appl. No.: 14/788,944

(22) Filed: Jul. 1, 2015

(65) Prior Publication Data

US 2017/0005357 A1    Jan. 5, 2017

(51) Int. Cl.
| | |
|---|---|
| *H01M 8/00* | (2016.01) |
| *H02J 3/38* | (2006.01) |
| *H01M 8/18* | (2006.01) |
| *H01M 8/04664* | (2016.01) |
| *H01M 8/04828* | (2016.01) |
| *H01M 8/04537* | (2016.01) |
| *H01M 8/124* | (2016.01) |

(52) U.S. Cl.
CPC ......... *H01M 8/186* (2013.01); *H01M 8/0494* (2013.01); *H01M 8/04604* (2013.01); *H01M 8/04671* (2013.01); *H01M 8/04679* (2013.01); *H02J 3/387* (2013.01); *H01M 2008/1293* (2013.01); *H01M 2250/10* (2013.01); *Y02B 90/14* (2013.01); *Y02E 60/525* (2013.01); *Y02E 60/528* (2013.01)

(58) Field of Classification Search
CPC ................................. H01M 8/00; H02J 3/387
See application file for complete search history.

(56) References Cited

U.S. PATENT DOCUMENTS

| | | | | |
|---|---|---|---|---|
| 2002/0109410 A1* | 8/2002 | Young | ....................... | H02J 3/32 307/64 |
| 2004/0205032 A1* | 10/2004 | Routtenberg | ....... | B60L 11/1881 705/400 |
| 2006/0219448 A1* | 10/2006 | Grieve | ................ | B60L 11/1816 180/65.31 |
| 2010/0157634 A1* | 6/2010 | Yu | ............................. | H02J 3/38 363/98 |

(Continued)

*Primary Examiner* — Matthew J Merkling
(74) *Attorney, Agent, or Firm* — Parsons Behle & Latimer

(57) ABSTRACT

A Reversible Solid Oxide Fuel Cell (RSOFC) system includes a Reversible Solid Oxide Fuel Cell (RSOFC) unit, a bi-directional alternating current/direct current (AC/DC) converter, coupled to the RSOFC unit, a common bus, coupled to the bi-directional AC/DC converter and to a power grid, and a plurality of RSOFC subsystems, coupled to receive power only through the common bus. The RSOFC unit has a fuel cell mode, wherein the RSOFC unit produces electrical power from fuel, and an electrolysis mode, wherein the RSOFC unit consumes electrical power to produce the fuel. The bi-directional AC/DC converter is coupled to the RSOFC unit, and is configured to convert direct current (DC) electrical power produced by the RSOFC unit into outgoing alternating current (AC) power, and to convert incoming AC power into DC power for consumption by the RSOFC unit in electrolysis mode.

11 Claims, 6 Drawing Sheets

(56) References Cited

U.S. PATENT DOCUMENTS

2011/0008696 A1* 1/2011 Ballantine ......... H01M 8/04208
429/431
2012/0326653 A1* 12/2012 Godrich .................... H02J 1/10
320/101

* cited by examiner

ELECTRICAL POWER DISTRIBUTION SYSTEM AND METHOD FOR A GRID-TIED REVERSIBLE SOLID OXIDE FUEL CELL SYSTEM

GOVERNMENT RIGHTS

This invention was made with United States Government support under contract no. N394309-14-C-1487, awarded by the United States Department of Defense. The United States Government has certain rights in this invention.

FIELD OF THE DISCLOSURE

The present disclosure is related to power control in a grid-tied bi-directional power system. More particularly, the present disclosure relates to a system and method for bi-directional power distribution in a grid-tied Reversible Solid Oxide Fuel Cell (RSOFC) energy storage system.

BACKGROUND

Fuel cells are devices that convert chemical energy from a fuel, such as hydrogen, into electricity through a chemical reaction with oxygen or another oxidizing agent. There are several different types of fuel cells. Fuel cells generally include an anode, a cathode, and an electrolyte between the two. The most well-known type of fuel cell is the Proton Exchange Membrane (PEM) fuel cell, in which the electrolyte is a proton exchange membrane that allows ions (e.g. hydrogen ions) to pass through it, while electrons cannot. At the anode a catalyst oxidizes the hydrogen fuel, turning the fuel into positively charged ions and negatively charged electrons. The freed electrons travel through electrical conductors, thus producing the electric current output of the fuel cell. The hydrogen ions, on the other hand, travel through the proton exchange membrane to the cathode, where they react with a third chemical, usually oxygen, to create water vapor, which is typically exhausted as waste.

Another type of fuel cell is the solid oxide fuel cell (SOFC). Rather than a proton exchange membrane, the SOFC has a solid oxide or ceramic electrolyte. The solid oxide electrolyte conducts negative ions from the cathode to the anode, where the electrochemical oxidation of the oxygen ions with hydrogen occurs. Compared to PEM fuel cells, SOFC's can have higher efficiency, long-term stability, fuel flexibility, low emissions, and relatively low cost, in part because they do not include expensive platinum catalyst material. At the same time, SOFC's have higher operating temperatures than PEM fuel cells (typically between 500° C. and 1,000° C.), which results in longer start-up times, and they can experience degradation with repeated thermal cycling.

Fuel cells can theoretically work forward or backward. That is, they can operate to produce electricity from a given chemical reaction, or they can consume electricity to produce that chemical reaction. However, typical fuel cells, especially PEM fuel cells, are usually optimized for operating in one mode—either electricity generation mode or electrolysis mode—but are generally not built in such a way that they can be operated in both modes. Recently, however, reversible solid oxide fuel cells (RSOFC's) have been developed that can produce electricity from hydrogen fuel, or produce hydrogen fuel from electricity.

Because of these features, RSOFC's are considered good candidates for powering and storing energy on micro-grids. Micro-grids are local power distribution systems designed to supply local energy generation for both grid and off-grid connected facilities and communities, enabling a localized energy source in cases of emergencies or unreliable traditional grid use. The high cost and energy security issues associated with importing fuel to isolated or "islanded" grids has led to a growing desire to generate power onsite with alternative and renewable energy technologies, while reducing facility costs of importing electrical power. Energy storage is desirable to balance the micro-grid and improve efficiency, reduce fuel consumption, and provide power in the event of power outages. In order to stabilize a local power grid with continuous power, an RSOFC system can operate in Fuel Cell mode when needed, using the stored hydrogen to produce energy for the grid. This can allow for grid stabilization and improvement to power plant system efficiency.

Recently, there has also been interest in the energy sector in RSOFC's for energy storage, where they can be used in conjunction with renewable energy generation sources, such as wind and solar generation. In power generation systems, such as wind and solar energy systems, excess power must be stored or it is lost. Current systems available for storing energy present a variety of drawbacks, but RSOFC systems present a potential improvement in this area. Theoretically, excess power generated in off-peak hours can be sent to an RSOFC system operating in electrolysis mode to produce $H_2$, which is compressed and stored in tanks. The $H_2$ can then be used later in the same RSOFC system operating in fuel cell mode to provide supplemental power to the grid during peak hours or when specifically needed.

Notably, full scale application of RSOFC systems as energy storage and grid-stabilization systems has not previously been done. Consequently, many of the actual features that are needed for real world application of RSOFC's for energy storage and power grid stabilization have not previously been developed.

In making the first applications of this kind, it has been found that one challenge presented by RSOFC energy storage systems relates to power distribution and control. Specifically, an RSOFC system takes power from the local power grid to charge the system, and will generate and provide power to the grid when power is desired. However, prior configurations of grid-tied generating systems generally include separate AC/DC and DC/AC power supplies to run in parallel for each mode of operation, thus complicating controls and increasing the electrical footprint and cost of the system.

The present disclosure is intended to address one or more of the above issues.

SUMMARY

It has been recognized that it would be desirable to have a power distribution system and method for a fully integrated, grid-tied RSOFC energy storage system.

It has also been recognized that it would be desirable to have a power distribution system and method for an RSOFC system that does not depend upon multiple AC/DC converters.

In accordance with one aspect thereof, the present disclosure provides a Reversible Solid Oxide Fuel Cell (RSOFC) system, including a Reversible Solid Oxide Fuel Cell (RSOFC) unit, a bi-directional alternating current/direct current (AC/DC) converter, coupled to the RSOFC unit, a common bus, coupled to the bi-directional AC/DC converter and to a power grid, and a plurality of RSOFC subsystems, coupled to receive power only through the common bus. The RSOFC unit has a fuel cell mode, wherein the RSOFC unit produces electrical power from fuel, and an electrolysis mode, wherein the RSOFC unit consumes electrical power to produce the fuel. The bi-directional AC/DC converter is coupled to the RSOFC unit, and is configured to convert direct current (DC) electrical power produced by the RSOFC unit into outgoing alternating current (AC) power, and to convert incoming AC power into DC power for consumption by the RSOFC unit in electrolysis mode.

In accordance with another aspect thereof, the present disclosure provides a power distribution system for a Reversible Solid Oxide Fuel Cell (RSOFC) system, including a common bus, coupled between a power grid and a Reversible Solid Oxide Fuel Cell (RSOFC) system. The common bus includes a plurality of power circuit breakers, configured to trip on overload condition, and a plurality of subsystem circuit breakers, configured to trip on overload condition. Each power circuit breaker is coupled to a bi-directional AC/DC converter that is coupled to a Reversible Solid Oxide Fuel Cell (RSOFC) unit having a power generation mode and a power-consuming electrolysis mode. Each subsystem circuit breaker coupled to at least one of a plurality of RSOFC subsystems, whereby the plurality of RSOFC subsystems receive power only through the common bus, whether the RSOFC units are operating in power generation mode or electrolysis mode.

In accordance with yet another aspect thereof, the present disclosure provides a method for controlling a Reversible Solid Oxide Fuel Cell (RSOFC) system. The method includes selectively operating a fuel cell unit of a Reversible Solid Oxide Fuel Cell (RSOFC) system in either electrolysis mode or in fuel cell mode, providing power to the fuel cell unit from a power grid coupled to the RSOFC system via a common bus using a bi-directional alternating current/direct current (AC/DC) converter, when operating in electrolysis mode, and distributing power from the fuel cell unit to the power grid via the common bus using the bi-directional AC/DC converter, when operating in fuel cell mode. The method further includes powering electrical subsystems of the RSOFC system via the common bus when the fuel cell unit operates in either electrolysis mode or fuel cell mode.

Figure 1:
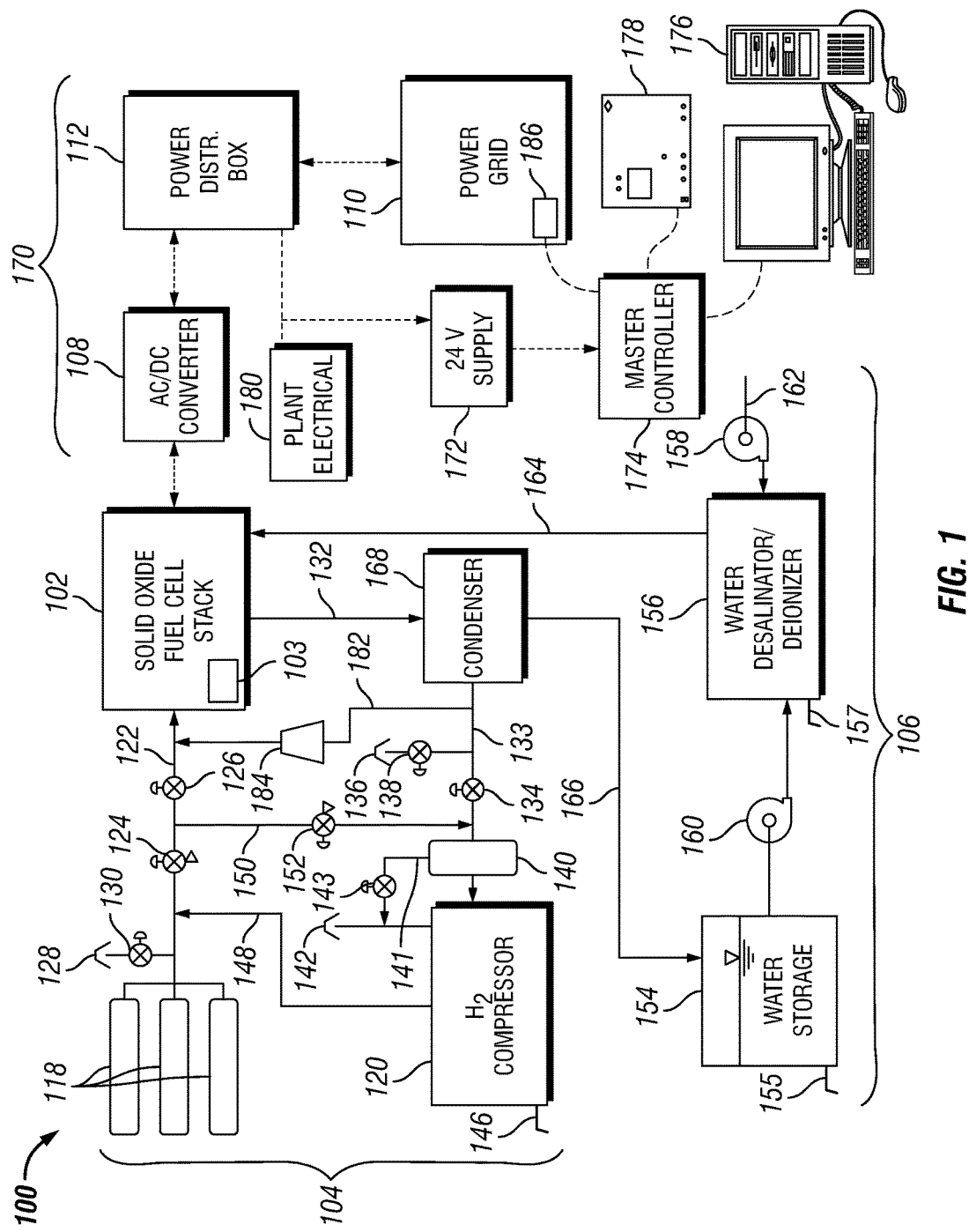
FIG. 1 is a schematic diagram of an embodiment of a Reversible Solid Oxide Fuel Cell (RSOFC) system.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

As noted above, in power generation systems, such as wind and solar energy systems, excess power must be stored or it is lost. Current systems for storing energy include flywheels, batteries, pump hydroelectric and compressed air storage, for example. Each of these methods present drawbacks that suggest the desirability of RSOFC energy storage systems. However, full scale application of RSOFC systems as energy storage and grid-stabilization devices has not previously been done.

Advantageously, a system and method have been developed for distributing power in a fully integrated, grid-tied RSOFC energy storage system that does not depend upon multiple AC/DC converters. Shown in FIG. 1 is a schematic diagram of an embodiment of a Reversible Solid Oxide Fuel Cell (RSOFC) energy storage system 100, configured in accordance with the present disclosure. The RSOFC system 100 acts as an energy storage device to store and supply energy to an electrical grid 110 based on the demand requirements from the grid, or commands from a grid network manager. When excess power is generated by the grid or the grid demands the RSOFC system to store energy, the RSOFC system can operate in electrolysis or EL mode to generate, compress, and store $H_2$ from the electrolysis of water. This is accomplished by applying power from the gird 110 to the RSOFC system 100, when operating in EL mode. When power is needed by the grid 110, the stored $H_2$ is fed to the RSOFC system 100 operating in fuel cell or FC mode to produce power for the grid.

Viewing FIG. 1, the system 100 generally includes an RSOFC unit 102 (also referred to as a "fuel cell stack" or "fuel cell unit" or "fuel cell subsystem"), which is connected to a hydrogen compression and storage system, indicated generally at 104, and a process water system, indicated generally at 106. The fuel cell unit 102 is electrically coupled to an AC/DC converter 108, which connects to the local power grid 110 through a power distribution box 112. The fuel cell subsystem 102 includes sensors, controls, etc. (not shown), and can include its own subsystem controller 103, which can interface with the system master controller 174, described below. Alternatively, the fuel cell subsystem 102 and its associated sensors, controls, etc. can interface directly with the master controller 174, allowing the master controller to directly control the fuel cell unit 102.

While a single fuel cell unit 102 is shown in FIG. 1, this is for illustrative purposes only. Those of skill in the art will recognize that multiple fuel cell units or stacks 102 can be electrically coupled together in parallel and/or series to provide the desired output voltage and current from the fuel cell system 100. The RSOFC unit 102 produces power from oxidation of stored hydrogen ($H_2$) from the hydrogen compression and storage system 104 when in fuel cell or FC mode, and generates hydrogen ($H_2$) through electrolysis of water from the process water system 106 when in electrolysis or EL mode. The reversible solid oxide fuel cell unit 102 includes various features that are not specifically shown, such as an anode vent and anode vent valve, a stack preheater, condenser, etc. These types of components are generally known, and will be appreciated by those of skill in the art.

The hydrogen compression and storage system 104 includes a group or array of hydrogen fuel storage tubes or cylinders 118 and a hydrogen compressor 120. The hydrogen fuel storage tanks 118 are configured to store hydrogen gas at high pressure, and are coupled to the fuel cell unit 102 via a hydrogen fuel line 122. As used herein, the terms "high pressure" or "elevated pressure" in reference to the hydrogen storage, means any pressure above about 250 psi. In one embodiment, the hydrogen fuel storage tanks 118 and the system 100 as a whole are designed to store hydrogen at a pressure above 1000 psi and more particularly up to about 2500 psi, but much higher pressures can also be used. For example, some hydrogen fuel cell systems store hydrogen at pressures of 10,000 psi and higher. The hydrogen fuel line 122 includes a pressure reducing valve 124 and a main hydrogen control valve 126. A high pressure hydrogen vent 128 and its associated valve 130 are also coupled to the hydrogen fuel line 122 to vent hydrogen gas in case of overpressure in the hydrogen fuel storage array 118. The pressure reducing valve 124 allows hydrogen gas to be provided from the hydrogen fuel storage array 118, which is at high pressure (e.g. 2500 psi), to the RSOFC unit 102 at lower pressure (e.g. 75 psi) when the RSOFC unit 102 is operating in fuel cell mode.

The compressor 120 is coupled to the RSOFC unit 102 via the fuel cell output line 132, which directs low pressure output from the fuel cell 102 through a condenser 168, which lowers the temperature of this output and initially separates a significant quantity of water from it, and thence into a low pressure hydrogen line 133. The compressor 120 receives low pressure hydrogen gas as output from the RSOFC unit 102 via the low pressure hydrogen line 133 when the RSOFC unit 102 is operating in electrolysis mode. A hydrogen recycle line 182 connects the low pressure hydrogen line 133 to the hydrogen fuel line 122, and includes a hydrogen recycle blower 184. In electrolysis mode, a small portion of the hydrogen output of the fuel cell 102 is recycled back to the hydrogen fuel line 122 via the hydrogen recycle line 182 as input to the fuel cell 102 in order to help prevent oxidation of the fuel cell electrodes. The hydrogen recycle line 182 is also useful in fuel cell mode for pumping residual hydrogen back for consumption in the fuel cell unit 102. When operating in fuel cell mode, some residual amount of hydrogen gas may pass through the fuel cell 102 without reacting and producing electricity. This residual hydrogen is returned to the hydrogen fuel line 122 by the hydrogen recycle line 182 and hydrogen recycle blower 184. Disposed in the low pressure line 133 are a compressor suction valve 134 and a fuel cell exhaust vent 136 and fuel cell exhaust vent valve 138. A buffer tank 140 is also coupled in line with the low pressure line 133 near the intake of the compressor 120. The buffer tank 140 is fed $H_2$ generated by the fuel cell subsystem 102. The buffer tank 140 is coupled to the compressor suction vent 142 via a buffer tank vent line 141 and buffer tank vent valve 143. Pressure is monitored in the buffer tank 140 to ensure that pressure does not get too high or too low, since this could cause elevated operating pressure in the fuel cell subsystem 102, or, in the case of low pressure, create a vacuum that could draw air in if there is a leak.

The compressor 120 includes a compressor suction vent 142, along with a drain 146 for allowing drainage of water from the compressor condenser (not shown). The compressor 120 is configured to receive low pressure hydrogen gas produced from the electrolysis of water in the fuel cell 102, and compress this gas and provide it to the hydrogen fuel storage array 118 via the compressed hydrogen supply line 148. A compressor recycle line 150 is also connected between the hydrogen fuel line 122 and the low pressure line 132, with a compressor recycle line valve 152 therein. The compressor recycle line valve 152 can be a pressure reducing valve, since the pressure in the low pressure line 133 is generally below the pressure in the hydrogen fuel line 122. Alternatively, a separate pressure reducer (not shown) can be included in the compressor recycle line 150. This compressor recycle line 150 is coupled to the hydrogen fuel line 122 downstream of the pressure reducing valve 124, and allows low pressure hydrogen to be recycled through the compressor 120 if desired, rather than being fed to the fuel cell unit 102, as discussed in more detail below. Other features of the compressor 120, such as a condenser, cooler, etc., are not shown in FIG. 1, but will be appreciated by those of skill in the art.

The process water system 106 includes a water storage tank or reservoir 154 and a desalinator/deionizer unit 156, along with a water supply pump 158 and a process water pump 160. The water storage tank 154 can include a drain 155 for allowing the process water to be drained from the tank. The process water system 106 provides deionized water to the RSOFC unit 102, whether from the water storage tank 154 or the deionizer unit 156 or both, when the RSOFC unit 102 is operating in electrolysis mode, and can receive exhaust water from the RSOFC unit 102 when the RSOFC unit 102 is operating in fuel cell mode (water output from a fuel cell operating in fuel cell mode is naturally deionized). Deionized water is desired for electrolysis in order to avoid the introduction of minerals and chemical species that can interfere with the electrolytic reactions of the fuel cell unit 102 or degrade its condition.

The deionizer unit 156 can be connected, as indicated at 162, to any suitable water supply, such as a local municipal potable water distribution system, or even to a sea water intake. The deionizer unit 156 can be configured to remove salt from the water through a multistep process of reverse osmosis, followed by a deionization step to further purify the water. Where the water supply is a potable water source, the process can involve only the deionization step. A sensor (not shown) can be placed on the exit of the deionizer unit 156 to measure the conductivity of the water, to determine the completeness of deionization and its suitability for use in the RSOFC unit 102. A drain 157 can be provided for drainage of brackish water from the deionizer unit 156.

The process water system 106 is coupled to the fuel cell unit 102 through the process water pump 160 via a water supply line 164 and a water return line 166, which can return water from the condenser 168 to the water storage tank 154. With this configuration, the RSOFC system 100 can be a closed-loop system, retaining and recycling process water whether operating in electrolysis or fuel cell mode. In fuel cell mode, water exhaust produced in the fuel cell unit 102 can be condensed by the condenser 168 and returned to the water storage tank 154 via the water return line 166. In electrolysis mode, process water can be drawn from the water storage tank 154 and/or the deionizer unit 156 and pumped via the process water pump 160 to the fuel cell unit 102, where the water is split into hydrogen, which is compressed and stored, and oxygen, which is exhausted to the atmosphere. Alternatively, the RSOFC system 100 can be an open-loop system, exhausting water vapor to the atmosphere when operating in fuel cell mode, and drawing water from the process water system 106 as needed when operating in electrolysis mode. In electrolysis mode, the condenser 168 acts as a heat exchanger, reducing the fuel cell exhaust temperature (e.g. from about 250° C. to about 40° C.) so that inlet temperatures for the anode recycle blower and the compressor are in a desired range. In this process, water is condensed out of the output stream, and this water is returned to the water storage reservoir 154 via the water return line 166.

The RSOFC 100 also includes an electrical subsystem, indicated generally at 170. The electrical subsystem includes the AC/DC converter 108, the power distribution box 112, as well as a connection from the power distribution box 112 to a 24 volt DC power supply 172 for powering electrical subsystems of the RSOFC system 100, including a master controller 174, and a connection to supply power to the plant electrical subsystems 180, sometimes also referred to as the "balance of plant" electrical. As noted above, the fuel cell unit 102 is electrically coupled to the local power grid 110 through the power distribution box 112. The AC/DC converter 108 is a bi-directional converter that converts DC output from the fuel cell unit 102 into grid power (e.g. 3 phase—4 wire, 480 VAC 60 Hz) for transmission into the power grid 110 when the fuel cell unit 102 is operating in fuel cell mode. Conversely, the AC/DC converter 108 also converts AC input from the power grid 110 into DC input for the fuel cell unit 102 when it is operating in electrolysis mode. The electrical subsystem 170 can also include other elements, such as a transformer (not shown) to convert grid power to 110V AC for utilities use, a ground fault detector (not shown) to measure any leakage current for the entire power distribution box 112, current sensors (not shown) for reading the current being drawn by each individual load, including total parallel current for all AC/DC loads, and a line monitor (not shown), which measures voltage on the electrical line connecting the RSOFC system 100 to the power grid 110 to read both grid voltage and current. The power grid 110 can include a grid controller 186, which is coupled (e.g. via Ethernet, Internet, wireless connection, etc.) to the master controller 174 and provides signals indicating a power demand or power surplus condition of the grid 110. When the grid 110 demands power, the master controller 174 can cause the system 100 to enter fuel cell mode, and produce power for the grid 110, so long as it has a suitable fuel supply. Conversely, when the grid 110 has a surplus of power, the master controller 174 receives a signal from the grid controller 186 indicating this, and causes the system 100 to enter electrolysis mode to produce and store hydrogen gas.

The power grid 110 can also include grid-coupled solar, wind or other renewable energy generation systems. The RSOFC unit 102 can thus receive electricity from these renewable energy generation systems when operating in electrolysis mode, thus allowing the system 100 to store excess energy that is generated from these variable and intermittent sources. It is to be understood that wind and solar generation systems are only two examples of many types of energy input sources that could be coupled to the RSOFC system 100 through the grid 110. Those of skill in the art will recognize that there are other energy input sources that could be associated with the RSOFC system 100.

The master controller 174 is a microprocessor device, having a processor and system memory, and provided with suitable software for monitoring and controlling all of the systems and connections of the RSOFC system 100. The master controller can include or be coupled to a computer terminal 176 and/or a control panel 178 for allowing user input and monitoring.

The RSOFC system 100 also includes a variety of sensors (not shown) that are either associated directly with various components of the RSOFC system 100, or are associated with fluid conduits, valves, electrical connections, etc. These sensors are coupled to provide sensor data (e.g. via wired electrical connections) to the master controller 174. For example, the hydrogen fuel line 122, the low pressure hydrogen line 133, the compressed hydrogen supply line 148 and any other components that handle the storage or transmission of hydrogen can include sensors for pressure, temperature, flow rate, hydrogen presence, water content, etc. Pressure in the hydrogen storage tanks 118 and downstream regulated pressure can be monitored, and values can be sent to the master controller 174. Other sensors can be associated with the various valves to provide indications of valve state (e.g. open or closed). Similarly, pressure, temperature and flow sensors, as well as pump operating sensors can also be associated with each component of the process water system 106.

Electrical sensors and switches (not shown) can also be associated with the AC/DC converter 108 and the power distribution box 112 and their related electrical connections, both internally and with the power grid 110, to allow the master controller to receive input signals related to the conditions of the electrical subsystem 170 and the control system of the power grid 110. The master controller 174 is thus coupled to all components of the RSOFC system 100 and can control the modes of the RSFOC unit 102 and the related devices (e.g. the hydrogen compression and storage system 104 and the process water system 106) based on sensor data.

The RSOFC system 100 can also include a variety of other subsystems that are not specifically shown in FIG. 1, but can be included for control and operation, and will be familiar to those of skill in the art. For example, the various valves of the RSOFC system 100 can be power actuated valves, allowing remote control and monitoring of their state. For example, these can be pneumatically actuated valves, and the system 100 can include a compressed air subsystem (not shown) for providing power for actuating all of these valves in response to electrical control signals from the master controller 174. The compressed air pressure can be measured and monitored at the output of the air compressor (not shown) in order to be maintained higher than some desired working pressure, such as 80 psi.

The RSOFC system 100 can also include a flammable gas detection system (not shown) that includes multiple sensors to monitor for a combustible environment that could occur in the event of a leak of hydrogen. Sensor signals from the flammable gas detection system can be transmitted to the master controller 174, which analyzes these signals for any indication of a combustible environment.

The RSOFC system 100 can also include a thermal management system (not shown) that is configured to supply cooling water to the $H_2$ compressor and to the fuel cell unit 102 for its condenser. This cooling water system can be designed to supply an inlet temperature of about 25° C. and about 30 psi pressure to each system, for example.

Advantageously, the RSOFC system 100 shown in FIG. 1 can be scaled up or down as needed for a given location and application. It has been suggested, for example, that this type of system can be provided in a modular form in a standard size shipping container or the like, so that it can be easily transported to any location where it is to be used.

The various sensors of the RSOFC system 100 indicate the status of the various components of the system, and, based on the sensor input, the master controller 174 can determine a state of the RSOFC system 100 by applying a conditional logic algorithm. The master controller 174 can thus transition the RSOFC system between the fuel cell mode and the electrolysis mode based upon the sensor data and the system state. The result is an energy storage system that converts excess energy into hydrogen when in electrolysis mode, and compresses that gas for later use. In order to stabilize the power grid 110 with continuous power, the RSFOC system 100 can then switch to fuel cell mode and use the stored hydrogen to produce energy for the grid 110. The master controller 174 can thus control and orchestrate the various modes of the RSOFC system 100 to help ensure that power output meets the demand for power, and that excess power is not lost.

Figure 2:
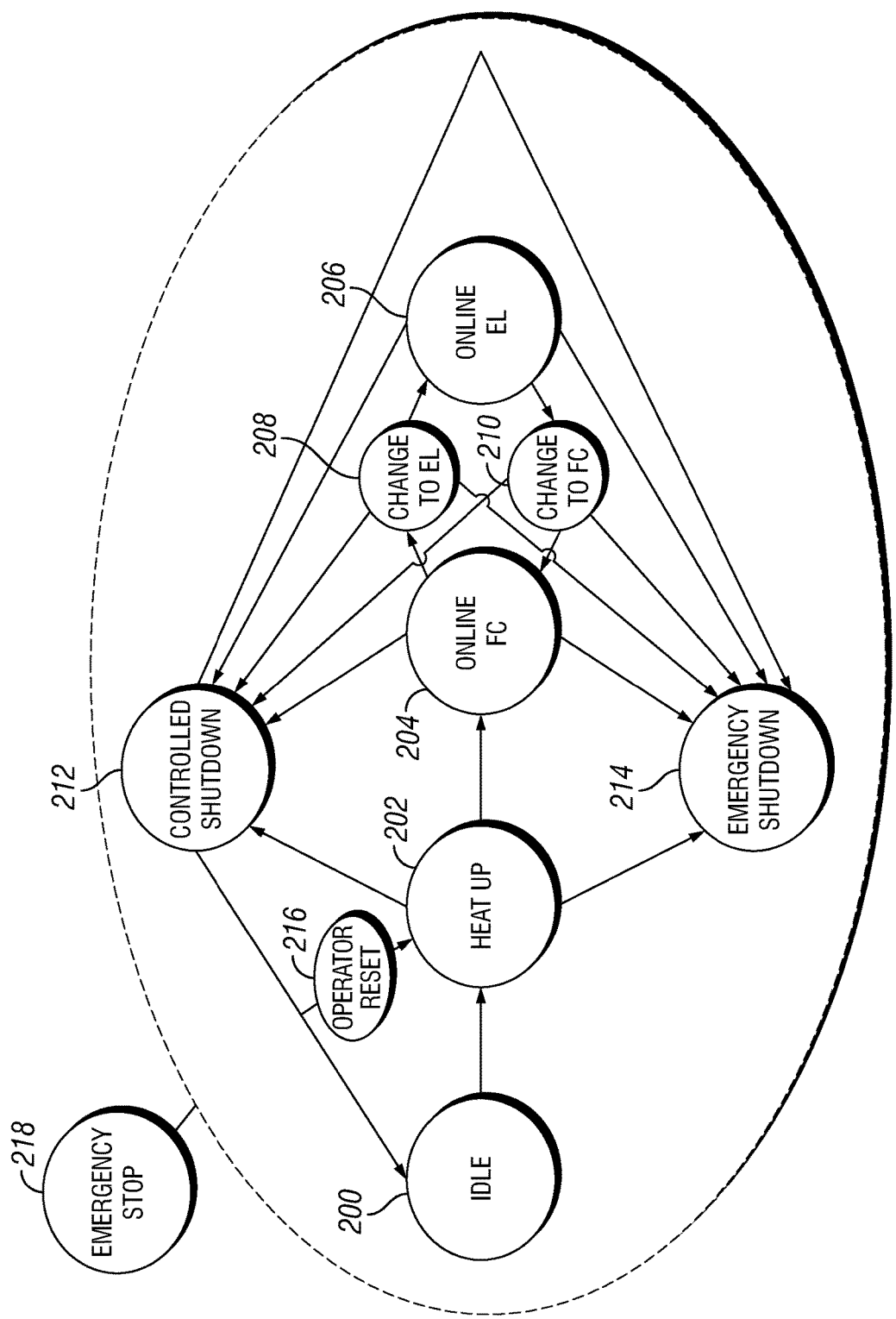
FIG. 2 is a mode transition diagram for an RSOFC system like that of FIG. 1.

As noted above, the master controller 174 interfaces with the control system of the power grid 110 and the various subsystems of the RSOFC system 100 to determine mode transition and status of the overall system. Shown in FIG. 2 is a mode transition diagram for an RSOFC system like that of FIG. 1. The RSOFC system 100 has four general operational modes, which are idle mode 200, heat up mode 202, online FC mode 204 and online EL mode 206. Generally, the master controller (174 in FIG. 1) can place the system in FC (fuel cell) mode 204 or EL (electrolysis) mode 206 based on the commands or power requirements from the grid 110. Between the power generation mode 204 and hydrogen generation mode 206 are two changeover modes—a changeover from fuel cell (FC) to electrolysis (EL) mode 208, and a changeover from electrolysis (EL) mode to fuel cell (FC) mode 210.

At any time during operation in heat up mode 202, online FC mode 204, online EL mode 206, or during the changeover modes 208 and 210, the system can be prompted (e.g. by an operator or through programmed operation by the master controller 174) into a controlled shutdown mode 212, in which the system will return to idle mode 200 or await an operator reset signal 216. In controlled shutdown mode 212 the master controller leaves the coolant pump ON in order to provide the necessary cooling to the system. A list of measurements are recorded and monitored. All subsystems follow their own controlled shutdown protocol and send confirmation to the master controller that controlled shutdown mode 212 has been successfully entered. The system can enter idle mode 200 when the fuel cell subsystem has indicated it has completed its controlled shutdown. When returned to Idle, the pump is turned off and all valves are returned to their fail safe mode.

Alternatively, at any time during operation in the above-mentioned modes, the system can be prompted by the master controller 174 into an emergency shutdown mode 214. An emergency shutdown is an immediate shutdown of the system due to an operational failure. Emergency shutdown 214 can be initiated in response to a variety of situations, such as a signal indicating a combustible environment (i.e. a hydrogen leak), a failure of a subsystem of the RSOFC system 100, etc. In one embodiment, emergency shutdown only occurs if there is an electrical ground fault detected or a combustible gas sensor (not shown) detects gas concentrations at some level relative to a combustibility limit (e.g. sensing combustible gasses at 50% of a lower explosion limit). After the system enters emergency shutdown mode 214, the system remains in this mode until the fuel cell indicates that it is "shutdown," and until the operator manually resets the system. The operator cannot reset the system until the fuel cell is "shutdown." At this point the system can go into idle mode 200. The Emergency Shutdown mode 216 occurs when there is a catastrophic operational failure to one of the RSOFC subsystems. In such a situation, all equipment is turned off and placed into fail safe mode. All valves are de-energized, and pumps are turned off. Advantageously, the system is designed to fail safe. However, in emergency shutdown mode 214, selected sensors will remain online to allow monitoring, while the other subsystems of the RSOFC system 100 are shut down. The sensor systems remain online to monitor components of the system.

Further, the conditional logic algorithm of the master controller 174 or activation of an Emergency-Stop button (not shown) by an operator can shift the system into emergency stop mode 218 at any time. The emergency stop button opens the main circuit breaker to the RSOFC system 100, thus cutting all power to the system, including power to sensors, etc. In order to restart the system after an emergency stop, the main breaker is first closed to restore power, and the system startup procedures outlined in FIG. 3 are then commenced.

As indicated above, the primary function of the master controller 174 is to orchestrate the operation of the subsystems of the RSOFC system 100 to provide and store electrical power for the grid 110. The master controller 174 receives sensor inputs from the various subsystems, and, based on these input values, the conditional logic algorithm of the master controller will instruct the RSOFC subsystems to enter the appropriate mode, and/or to transition from one mode to another. It has been found that substantial care is desirable when switching between fuel cell (SOFC) and electrolysis (SOEC) modes. That is, the FC to EL and EL to FC changeover modes 208, 210 warrant significant control to avoid certain undesirable conditions. For example, it is desirable to remove excess water and/or hydrogen from the system before the FC to EL transition occurs, since this transition involves going from a high $H_2$ concentration to a high water concentration. Accordingly, in Changeover FC to EL mode 208 the master controller 174 reads an array of measurements from the sensor data until the system is ready to switch to EL mode 206. The conditional logic control algorithm embedded in the system master controller 174 looks at system parameters and states along with micro-grid commands to determine when and what transition should occur.

Figure 3:
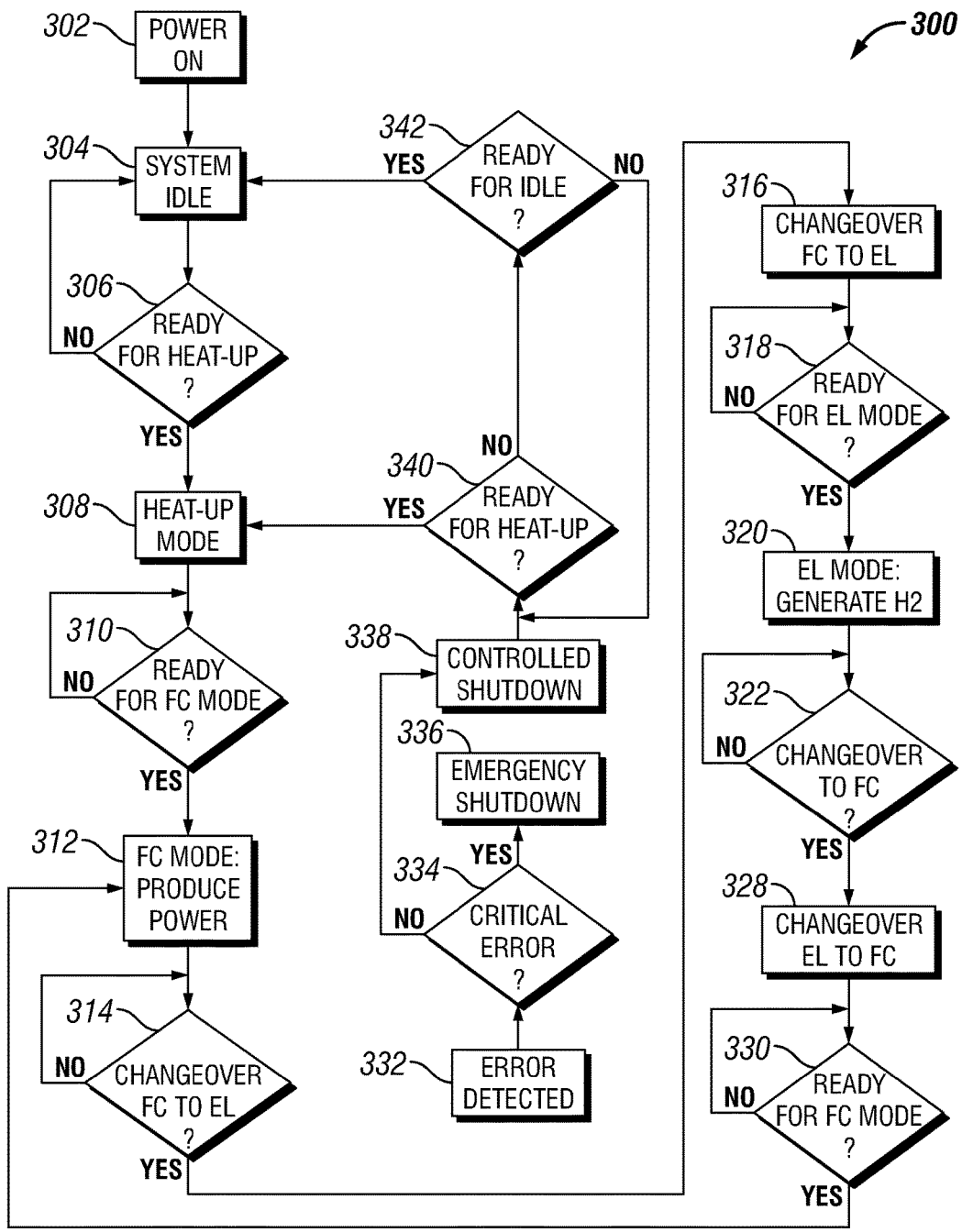
FIG. 3 is a high level flowchart of an embodiment of a method for controlling an RSOFC system in accordance with the present disclosure.

Provided in FIG. 3 is a high level flowchart showing one embodiment of an operational method, indicated generally at 300, by which the master controller 174 controls the RSOFC system 100. As shown in FIG. 2 and discussed above, the RSOFC system 100 has four basic operational modes, which are also shown in FIG. 3. These modes include an idle mode 304, a heat up mode 308, online FC mode 312, and online EL mode 320. There are also two changeover modes: a changeover FC (fuel cell) to EL (electrolysis) mode 316, and a changeover EL to FC Mode 328.

After system start, indicated at block 302, the next step is to enter idle mode 304 until the fuel cell is ready for heat up, as indicated at block 306. The system remains in idle mode until the fuel cell is ready for heat up, as indicated at block 306. When the system is ready, as determined by the master controller 174, it enters heat up mode 308, during which the fuel cell stack is heated to its desired operating temperature range. Until the desired temperature has been achieved and other sensors indicate the fuel cell is ready, as indicated at block 310, the system does not move forward. Once these conditions are met, the system enters FC (fuel cell—power generation) mode 312.

The system remains in FC mode 312 until the grid indicates that power is not needed, or the $H_2$ supply is indicated to be too low for continued fuel cell mode, as indicated at block 314. When these latter indications are received, the system shifts to a first changeover mode—change over FC to EL 316, which involves system adjustments to allow transition from producing power from the fuel cell to consuming power and generating hydrogen. The changeover FC to EL mode continues until the master controller determines that the RSOFC is ready for online EL (electrolysis) mode (or, where there is a separate controller 103 for the fuel cell subsystem 102, until the controller 103 of the fuel cell unit 102 signals the master controller 174 that it is ready for electrolysis mode), as indicated at block 318. Once these conditions are met, the system enter EL mode, block 320, and generates and stores hydrogen.

When the system changes from fuel cell (FC) mode to electrolysis (EL) mode (316 in FIG. 3), hydrogen gas is redirected from a condition in which it is vented to atmosphere, to a condition in which it feeds the compressor 120. This is accomplished by closing the vent valve 138 and opening the compressor suction valve 134. When the compressor 120 is on, a desired suction pressure is maintained in the buffer tank 140 (e.g. ~0.2 psi), Pressure control via this configuration of the buffer tank 140 and related structures ultimately sets the fuel cell system back pressure, which is an advantageous control aspect for the integrated RSOFC system 100.

In Change over FC to EL mode 316 the starting pressure in the low pressure line 133 feeding the $H_2$ compressor 120 is subject to a specific control method that insures that the line pressure is prepared for transitioning the product gas from the fuel cell 102 and setting the fuel cell system operating pressure. In changeover FC to EL mode 316, the compressor recycle line valve 152 is opened to set the pressure in the low pressure line 133. In the event there is a higher than desired pressure, the buffer tank vent valve 143 can be opened to purge the gas until the desired pressure set point is reached. This prevents shocking the fuel cell unit 102 during transition to feeding the $H_2$ compressor, and helps ensure that air is not sucked into the compressor 120 due to a resulting negative pressure when the compressor is initially turned on.

Another advantageous control capability for the RSOFC system 100 is its ability to keep the fuel cell 102 "online" in the event there is a failure in the compression system 120. Thermal cycling of the fuel cell 102 can cause accelerated degradation of its components, and it is thus desirable to keep the system "hot," Advantageously, the present system implements a "vent" strategy in which certain alarms will shut down the compressor 120, and switch the vent valve 138 and compressor suction valve 134 to positions allowing the gas to vent through the fuel cell exhaust vent 136, as done in FC-EL mode 316. In this condition $H_2$ is still being produced, but the fuel cell unit 102 will remain hot until the alarm-inducing condition can be resolved. Once any fault is remedied, an operator reset will allow the system 100 to resume compressing $H_2$ gas. The process to maintain proper line pressure in the low pressure line 133, discussed above, is also implemented in this condition.

The EL mode 320 can continue until the hydrogen storage array (118 in FIG. 1) is full. Once the hydrogen storage array is full, the master controller determines whether the system is ready to transition from EL to FC mode, as indicated at block 322. This determination can be based on factors such as whether the power grid is indicating a demand for power. If neither of these conditions apply, the master controller can open a system vent (e.g. the exhaust vent 136 in FIG. 1), and the system can continue to produce hydrogen until one of those two conditions change. If power is not needed and the hydrogen storage array 118 is full, the system can remain in this mode as long as desired. However, there is usually a demand for power in the grid, and thus this condition is not likely to persist for a long period of time. Additionally, the system can enter this vent state if some fault of the compressor is detected, and the system is not yet ready to changeover to fuel cell mode.

Once the power grid indicates a demand for power, the system shifts to a second changeover mode—change over EL to FC 328, which involves system adjustments to allow transition from consuming power and generating hydrogen back to producing power by the fuel cell. The system remains in this changeover mode 328 until the master controller determines that the fuel cell is again ready to enter fuel cell (FC) mode (e.g. based on whether the fuel cell is in proper operating condition), as indicated at block 330, after which the system can return to FC (fuel cell—power generation) mode 312.

Throughout operation of the process shown in FIG. 3, the master controller 174 continually receives sensor input and evaluates the system condition. At any point, if an error or degraded condition is detected, the system can react in a variety of ways. When an error is detected, as indicated at 332, the master controller determines, based upon its programming, the severity of the error, as indicated at 334. If the error is a critical error, such as an electrical ground fault or detection of combustible gas above some threshold level, the system can proceed directly to the emergency shutdown stage 336, which terminates operation of the system, as discussed above with respect to FIG. 2. However, if the error is not one requiring an emergency shutdown, but is more than a minor error that merely produces an alarm indication, the system can proceed to a controlled shutdown 338.

Following controlled shutdown 338, the system remains ready for reset, either to the idle mode 304 or to the heat-up mode 308. Specifically, the master controller inquires at block 340 whether the fuel cell system is ready to re-enter heat-up mode. If so, the system proceeds to heat-up mode 308. If not, the master controller next considers whether the system is ready to enter idle mode 306, and transitions to that mode if the answer to the query at block 342 is affirmative. However, if the answers to both of these queries are negative, the system can repeat this series of inquiries until one or the other turns positive, or until some programmed limit is reached.

Figure 4:
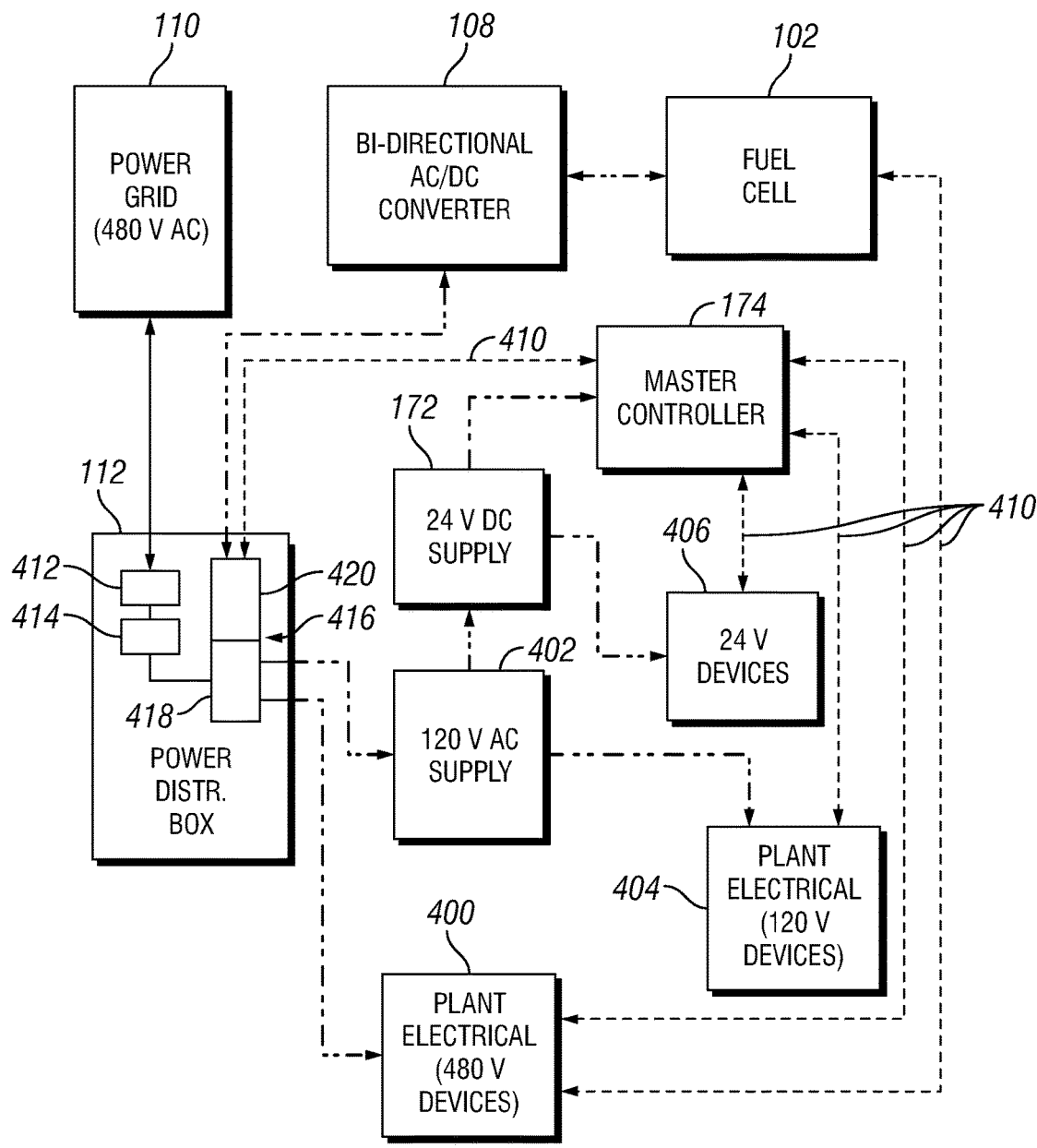
FIG. 4 is a schematic diagram of an electrical distribution for an RSOFC system like that shown in FIG. 1, in accordance with the present disclosure.

Advantageously, the present disclosure provides an electrical distribution system for a grid-tied RSOFC system like that shown in FIG. 1. Shown in FIG. 4 is a schematic diagram of an embodiment of an electrical distribution system that can be used with the RSOFC system shown and described above. This view shows electrical connections that provide power to the various elements of the system, as well as electrical connections that provide communications and data between the various elements. Many of the elements of FIG. 4 are also shown in FIG. 1, including the power grid 110, which is connected to the power distribution box 112, which provides connections to all other elements of the system. The fuel cell 102 is connected to the power distribution box 112 through the bi-directional AC/DC converter 108. This converter transforms DC power output from the fuel cell 102 into AC power that can be transmitted to the power grid 110 via the power distribution box 112. It also transforms AC power from the power grid 110 into DC input power to the fuel cell 102, when the fuel cell operates in electrolysis mode.

The power distribution box 112 can include circuit breakers and/or switches for each portion of the electrical system. Specifically, the power distribution box includes a main system circuit breaker 412, a line monitor 414, which monitors the voltage on the line to and from the power grid 110, and a common bus 416. The line monitor 414 can have a data connection that allows data to be sent from the line monitor 414 to the master controller 174. The common bus 416 comprises a series of circuit breakers that are divided into two different categories. A first part of the bus 416 is a system circuit breaker panel 418, which includes circuit breakers for all parts of the RSOFC system except for the fuel cell 102. In the embodiment shown in FIG. 4, these circuit breakers are all 480 V 3-phase breakers, carrying current from the power grid 110. These system circuit breakers can vary in current-carrying capacity, depending upon the load that is anticipated for each, as discussed in more detail below. In one embodiment, the system circuit breaker panel 418 includes eight circuit breakers, varying from 1.5 amp to 120 amp capacity. The second part of the bus 416 is a power circuit breaker panel 420. This power circuit breaker panel includes one or more remotely operable circuit breakers for the fuel cell 102, as discussed in more detail below.

Advantageously, the power distribution box 112 distributes power to all of the various components of the RSOFC system (100 in FIG. 1) that support operation of the fuel cell 102 and related devices. Those of skill in the art will recognize that grid electrical power is generally 480 V AC, which is only directly suitable for some uses. In the present case, the power distribution box 112 transmits this power directly via the system circuit breaker panel 418 to some of the plant electrical devices that operate on 480 V AC power, indicated at 400, some of which are shown in FIG. 1. For example, the compressor system 120 includes the compressor unit itself (not shown separately), and the fuel cell 102 includes a variety of related systems that operate on 480 V AC, including an air blower, and a cooling system with a coolant pump. The water desalinator/deionizer 156 can also operate on power directly from the grid.

Many other devices that are part of the RSOFC system operate on different types of power, and this is also illustrated in FIG. 4. The power distribution box 112 is connected via the system circuit breaker panel 418 to a 120 V supply 402, which transforms the 480 V AC power from the grid into 120 V AC power for other systems. For example, the 120 V supply 402 provides power to plant electrical devices that operate on 120 V electrical power, indicated at 404. These can include a variety of devices that are not specifically shown in FIG. 1, such as an air compressor, a chiller that is part of the compressor system 120, and an exhaust fan for the fuel cell 102. The plant electrical can also include one or more 120 V AC power outlets (not shown) for use by plant operators. The 480 V plant electrical indicated at 400, the 120 V supply 402 and the 120 V plant electrical indicated at 404 and all downstream devices can be considered part of the "balance of plant" electrical, shown at block 180 in FIG. 1.

The 120 V supply 402 also provides power to the 24 V supply 172. This device transforms the 120 V AC power into 24 V DC power for the master controller 174 and other 24 V devices, indicated at 406. These other 24 V devices can include actuators for power-operated valves for the hydrogen, air and water systems and vents that are part of the RSOFC plant 100, as well as a booster pump for the water deionizer unit (156 in FIG. 1) and various sensors that exist throughout the plant.

The various portions of the plant are interconnected by communications lines, indicated generally at 410, which transmit signals for sensing and control of the various devices. Thus, the master controller 174 is electrically coupled to the various 24 V devices 406, to the 120 V devices 404, and the 480 V devices. For example, the master controller 174 is coupled to the actuators for the various power-operated valves, vents, pumps, sensors, compressors, blowers, chillers, and other devices throughout the RSOFC plant 100, whether they operate on 24 VDC, 120 VAC, or 480 VAC. These connections allow the master controller 174 to receive signals from these devices, and to provide control signals to them. The 480 V plant electrical 400 can also include what is termed the fuel cell "balance of plant," which can include an air blower, and a cooling system with a coolant pump, as discussed above. For this reason, the 480 V plant electrical 400 can have a direct communication link with the fuel cell 102 to allow the exchange of control signals between the fuel cell and these devices.

While the bi-directional AC/DC converter 108 and the fuel cell 102 are represented in FIG. 4 as single blocks, each of these blocks can represent multiple corresponding units. That is, the fuel cell 102 can comprise multiple individual fuel cell units 102, with a unique bi-directional AC/DC converter 108 associated with each fuel cell 102. In one embodiment, the bi-directional AC/DC converter 108 comprises 8 individual bi-directional AC/DC converter units 108, each one corresponding to one of 8 individual fuel cell units 102. Consequently, the power circuit breaker panel 420 can include 8 individual circuit breakers, each one corresponding to one of the AC/DC converters 108 and its corresponding fuel cell 102.

The circuit breakers in the power circuit breaker panel 420 are remotely operable under control from the master controller 174, via a communication line 410. With this configuration, the programming of the master controller 174 can disable any one of multiple fuel cells 102 and AC/DC converters 108 according to the conditional logic algorithm of the master controller 174, and based on the system state.

Figure 5:
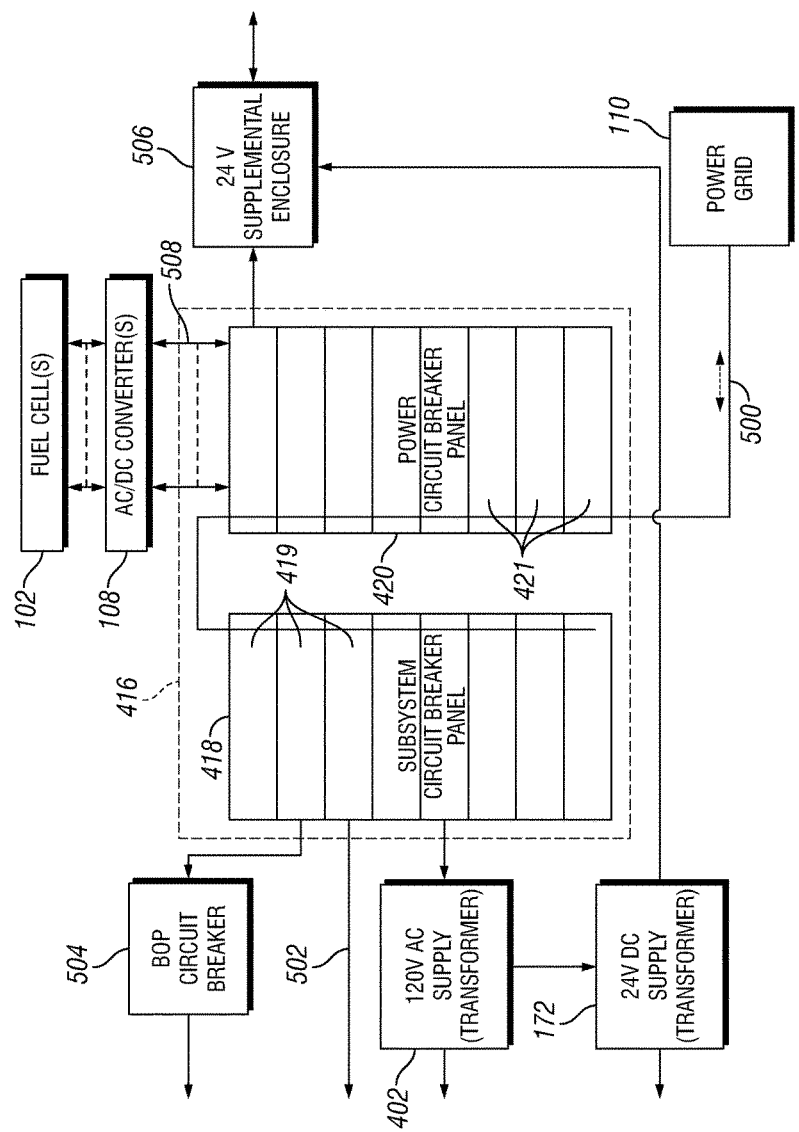
FIG. 5 is a schematic diagram of the common bus line arrangement of the power distribution box of the electrical distribution system shown in FIG. 4.

Shown in FIG. 5 is a schematic diagram of the common bus 416 that is included as part of the power distribution box (112 in FIG. 4) and other electrical elements that are associated with the power distribution system. This diagram provides a slightly different view of the electrical distribution system shown in FIG. 4, in order to show some of its different features. It is to be understood that, electrically speaking, the common bus 416 is a single electrical element, but not necessarily a single physical device. Thus, the bus 416, shown in outline in FIG. 5, includes the system circuit breaker panel 418 and the power circuit breaker panel 420. Each of these panels is connected to 480 VAC, 3-phase power from the power grid, indicated by the grid power line 500.

The system circuit breaker panel 418 can include a plurality of circuit breakers 419 that provide 480 VAC, 3-phase power to various "constant" loads, meaning that the power output for these loads from the system circuit breaker panel 418 is unidirectional, not bi-directional. For example, the system circuit breaker panel 418 can provide power directly to various "balance of plant" (BOP) elements, such as an air blower, cooling system, etc. (represented by block 400 in FIG. 4), via a power supply line 502 and through a separate BOP circuit breaker 504. The system circuit breaker panel 418 also provides power to a step-down transformer 402, which is the same as the 120 VAC supply 402 in FIG. 4. This transformer 402 transforms the 480 VAC, 3-phase power to 120 VAC single phase power for use by a variety of 120 VAC plant electrical devices, as indicated at block 404 in FIG. 4.

The 120 VAC power from the step-down transformer 402 is also provided to a load center device 172, which is the same as the 24 V DC supply 172 in FIGS. 1 and 4. This 24

V DC supply 172 is another transformer, which transforms the 120 VAC power to 24 V DC for use by a variety of 24 V devices, indicated at 406 in FIG. 4, as well as the master controller, indicated at 174 in FIGS. 1 and 4. This 24 V DC power can be transmitted to these various devices through a 24 V DC supplemental enclosure 506.

The power circuit breaker panel 420 also includes one or more circuit breakers 421, which are remotely operable and bi-directionally coupled to the fuel cell(s) 102 via the fuel cell power lines, indicated at 508. In one embodiment, as only one example of a possible configuration, the RSOFC system includes eight (8) fuel cell units 102, eight (8) bi-directional AC/DC power converters 108, and the power circuit breaker panel 420 includes eight (8) remotely operable circuit breakers 421 that connect to these via eight fuel cell power lines 508. In one embodiment, each of the remotely operable circuit breakers 421 can have a 60 amp capacity. Those of skill in the art will recognize that this is just one example of a configuration for this type of system, and that the number, size, capacity and other features of these elements can vary.

The power circuit breaker panel 420 receives 480 VAC, 3-phase power through the grid power line 500, and is subject to control signals for its remotely operable circuit breakers 421 from the master controller 174 via the communications line 410. The power connection of the grid power line 500 to the power circuit breaker panel 420 is bi-directional, meaning that power can flow from the grid 110 into the fuel cell power lines 508, or power can flow from the fuel cells 102 via the fuel cell power lines 508, into the power grid 110 via the grid power line 500.

With this configuration, the power distribution system disclosed herein can be described as having a first group or quantity (e.g. 8) of "constant" loads (i.e. those loads that flow unidirectionally via the system circuit breaker panel 418), and a second group or quantity (e.g. 8) of "bi-directional" loads (i.e. those loads that flow bi-directionally via the power circuit breaker panel 420), which, depending on the mode of the fuel cell system, can either draw or supply power via the common distribution bus 416. Each constant load is protected with its appropriately rated circuit breaker to ensure safety in case of an over-current event. Similarly, the bi-directional loads are protected with appropriately rated circuit breakers that have the capability to be remotely triggered by an external control source, to ensure safety in the case of an operational anomaly or other undesirable condition.

The remotely trigger-able capability of the power circuit breakers allows any of the "bi-directional" loads to be isolated in case of a fault with the RSOFC system 100. Isolating the faulted "bi-directional" load(s) allows the system to continue to operate properly with a lower total output power, meaning that the RSOFC system can still provide power to all internal and external loads when certain fault conditions are present, though at a lower total output power rating. By keeping all loads on the same power distribution bus 416, the "constant" loads can either be powered by the grid 110 or by the "bi-directional" loads 508. In a situation where the grid is non-existent (e.g. due to a shortage of power or an "islanding" problem), because of the way the power distribution panels are configured the "bi-directional" loads coupled to the power circuit breaker panel 420 can provide power to the "constant" loads coupled to the system circuit breaker panel 418, as well as to any other system part that is connected to the main power distribution bus 416. This allows for power to be provided without any external interruptions. Consequently, the entire RSOFC system 100 (including all subsystems—e.g. cooling systems, compressor, etc.) can continue to provide power until $H_2$ fuel is spent when operating in fuel cell mode, or continue producing and storing $H_2$ so long as power is available from the grid 110.

Figure 6:
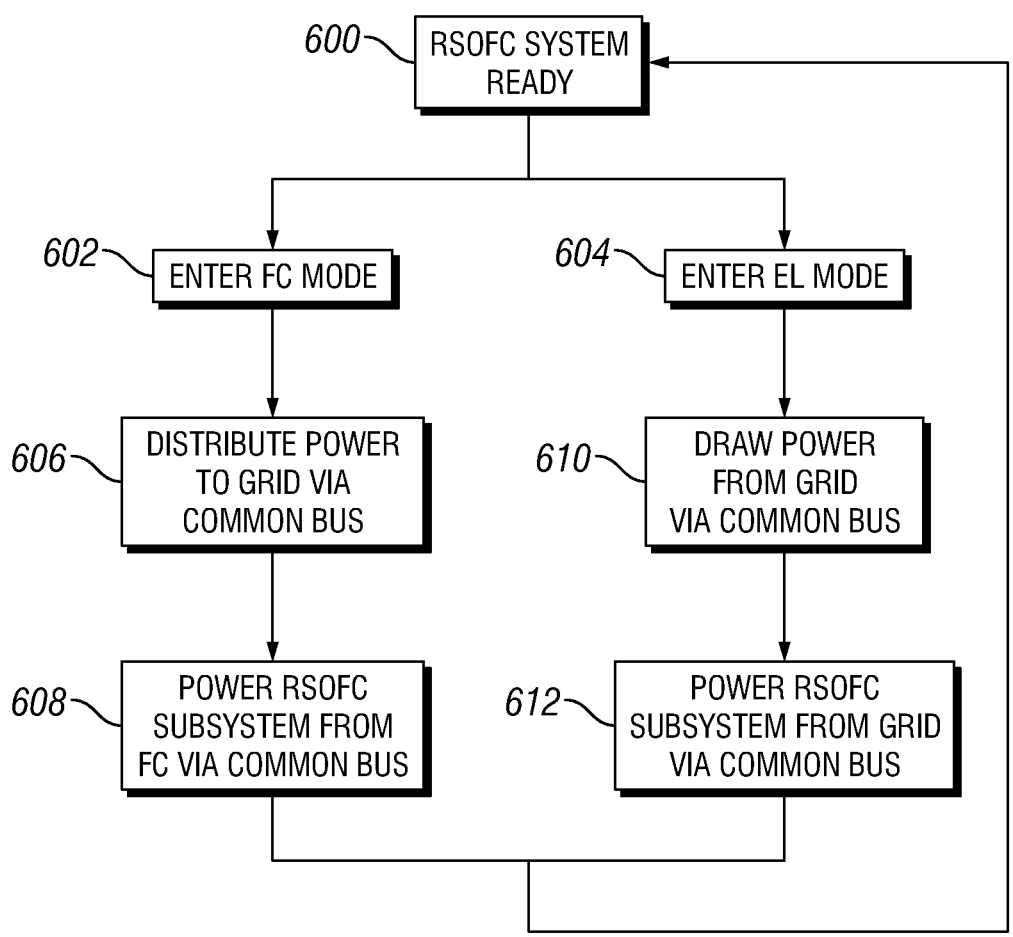
FIG. 6 is a flowchart outlining the steps in a method for power distribution in a grid-tied RSOFC system, in accordance with the present disclosure.

Shown in FIG. 6 is a flowchart outlining the steps in a method for controlling power distribution in a bi-directional RSOFC system in accordance with the present disclosure. When the RSOFC system is ready for operation, block 600, it will either enter FC mode, block 602, or EL mode, block 604. In FC mode, the RSOFC unit(s) will consume fuel (e.g. hydrogen gas from storage tanks) and generate electricity, which will be distributed to the power grid via the common bus, as indicated at block 606. At the same time, by virtue of the power distribution system disclosed herein, the RSOFC subsystems, rather than being powered by a separate connection to the power grid or other power source, will be powered by the output of the RSOFC units operating in fuel cell mode via the common bus, as indicated at block 608.

If the RSOFC system is operating in electrolysis mode, block 604, the RSOFC unit(s) will draw electrical power from the grid via the common bus, as indicated at block 610, and produce and store fuel (e.g. hydrogen gas, as discussed above). In this mode of operation, the RSOFC subsystems will also draw powered from the grid via the common bus, as indicated at block 612. The operation of the system either on FC power or grid power, this power being distributed via the common bus, will continue until a change is indicated, whether that is transition to another mode of operation or shutdown, as discussed above. At that point, the system can return to the RSOFC system ready status, block 600, in preparation for shifting to a different mode.

The distribution system disclosed herein thus integrates a bi-directional AC/DC converter 108 used for grid charging. The common bus 416 allows power to flow bi-directionally between the fuel cell stacks 102 through the power circuit breaker panel 420, while separately supplying the BOP parasitic power through the subsystem circuit breaker panel 418. Advantageously, this configuration integrates a single current command control system to individual bidirectional AC/DC converters, which allows power to flow bi-directionally on a single bus line, with parasitic power demands feeding off of the same bus line. The system disclosed herein thus provides the ability to integrate a bi-directional AC/DC converter into the RSOFC, which saves space and provides for a more compact system. This configuration enables the selective operation of the RSOFC unit(s) in both the fuel cell mode and the electrolysis mode. The design incorporates a single bus line that carries power to and from the fuel cells and the grid, and also carries power to the RSOFC subsystems, which avoids the use of dual systems for powering the fuel cell stacks and the RSOFC subsystems.

The design of the system also ensures operational safety in the case of an over-current event. In one embodiment, the power distribution system includes 16 circuit breakers that ensure and protect the components from an over-current event. Half of the circuit breakers are tied to a respective fuel cell through the corresponding AC/DC converter, and a certain load is applied to the fuel cell or carried from it to the grid. These power circuit breakers can be remotely triggered to remove the fuel cell from the system in case there are faults detected in the operation of that particular fuel cell. The single bus line design thus gives the system the ability to become its own micro-grid when operating in fuel cell mode. If the local power grid fails or is shut off for some reason and the RSOFC system 100 is in condition to operate in fuel cell mode, the fuel cells 102 can be operated to provide power for the overall RSOFC system 100.

The RSOFC system 100 and the bi-directional electrical distribution system disclosed herein thus provides a fully integrated, grid-tied RSOFC energy storage system. It is believed that bi-directional AC/DC converters have not previously been used in an RSOFC type system of this sort. Previously, to obtain a bi-directional capability in order to provide or draw power from a fuel cell system, a dual system including a combination of AC-powered and DC-powered power supplies have been used. Advantageously, the present system accomplishes this objective using a single bi-directional power distribution system, thus reducing the cost and complexity of the system.

Although various embodiments have been shown and described, the present disclosure is not so limited and will be understood to include all such modifications and variations are would be apparent to one skilled in the art.

What is claimed is:

1. A Reversible Solid Oxide Fuel Cell (RSOFC) system, comprising:
    a Reversible Solid Oxide Fuel Cell (RSOFC) unit, having a fuel cell mode, wherein the RSOFC unit produces electrical power from fuel, and an electrolysis mode, wherein the RSOFC unit consumes electrical power to produce the fuel;
    a bi-directional alternating current/direct current (AC/DC) converter, coupled to the RSOFC unit, configured to convert direct current (DC) electrical power produced by the RSOFC unit into outgoing alternating current (AC) power, and to convert incoming AC power into DC power for consumption by the RSOFC unit in electrolysis mode;
    a common bus, coupled to the bi-directional AC/DC converter and to a power grid, wherein the common bus comprises:
        a plurality of subsystem circuit breakers, configured to trip on overload condition, coupled only to the RSOFC subsystems; and
        a plurality of power circuit breakers, configured to trip on overload condition, coupled only to the bi-directional AC/DC converter and the RSOFC unit; and
    a plurality of RSOFC subsystems, coupled to receive power only through the common bus.

2. The system of claim 1, wherein the power circuit breakers are remotely actuable via control wires coupled to a controller, comprising a processor and system memory, and including software for controlling the RSOFC system, the controller being part of the RSOFC subsystems.

3. The system of claim 2, further comprising:
    a power circuit breaker control relay, coupled to the power circuit breakers and to the controller, configured to provide actuation signals to the power circuit breakers in response to control signals from the controller.

4. The system of claim 1, wherein:
    the RSOFC unit comprises a plurality of RSOFC units;
    the bi-directional AC/DC converter comprises a plurality of bi-directional AC/DC converters, each RSOFC unit coupled to exactly one bi-directional AC/DC converter; and
    the plurality of power circuit breakers comprise one power circuit breaker for each bi-directional AC/DC converter and its corresponding RSOFC unit.

5. The system of claim 4, wherein actuation of one of the plurality of power circuit breakers stops operation of only the bi-directional AC/DC converter and the corresponding RSOFC unit associated with the one power circuit breaker.

6. The system of claim 1, wherein the common bus is configured to transmit 480 VAC, 3-phase power between the power grid, the bi-directional AC/DC converter and the RSOFC subsystems.

7. The system of claim 6, wherein the plurality of RSOFC subsystems include RSOFC system electrical devices, and one or more transformers for transforming the 480 VAC, 3-phase power for use by at least some of the RSOFC system electrical devices.

8. The system of claim 1, wherein plurality of RSOFC subsystems include a hydrogen compressor, a water supply system, a water deionizer, and a controller, the controller comprising a processor and system memory, and including software for controlling the RSOFC system.

9. The system of claim 1, wherein the RSOFC unit produces electrical power from gaseous hydrogen fuel in the fuel cell mode, and consumes electrical power to produce hydrogen gas by electrolysis of water in the electrolysis mode.

10. The system of claim 1, wherein the plurality of RSOFC subsystems includes a 24 volt DC power supply for power electrical subsystems of the RSOFC subsystems.

11. The system of claim 1, wherein the plurality of RSOFC subsystems includes a 120 volt power supply to transform power from the power grid into 120 volt AC power.

* * * * *